J. D. BUSH.
Automatic Fans.
No. 142,081. Patented August 26, 1873.
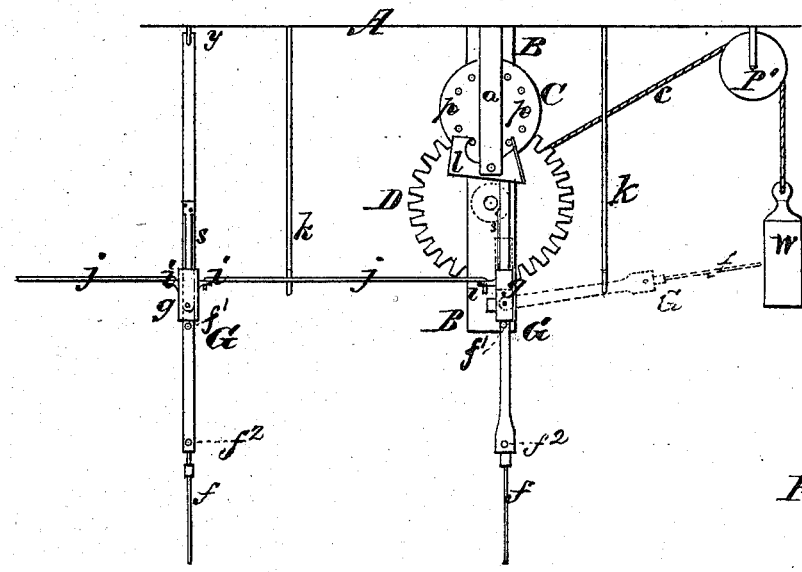
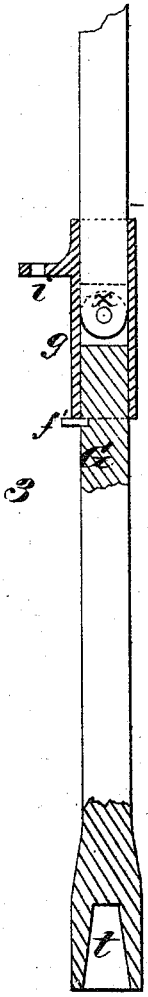
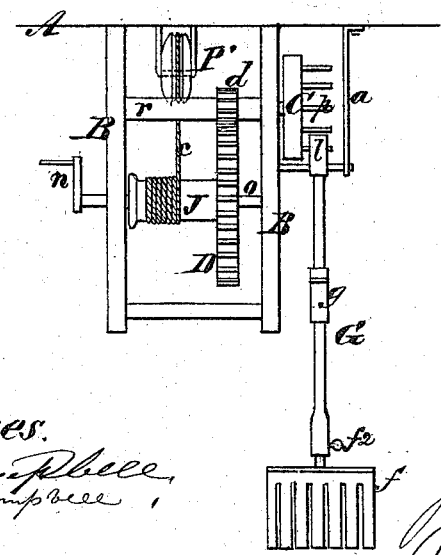
Witnesses: R. T. Campbell, J. T. Campbell
Inventor: John D. Bush
by his atty
Mason Fenwick Lawrence

UNITED STATES PATENT OFFICE.

JOHN D. BUSH, OF ELYTON, ALABAMA.

IMPROVEMENT IN AUTOMATIC FANS.

Specification forming part of Letters Patent No. 142,081, dated August 26, 1873; application filed March 18, 1873.

*To all whom it may concern:*

Be it known that I, JOHN D. BUSH, of Elyton, in the county of Jefferson, in the State of Alabama, have invented a new and useful Fly-Brush; and I do hereby declare that the following is a full, clear, and exact description thereof, reference being had to the accompanying drawings making part of this specification, in which—

Figure 1 is a view representing two of my swinging fly-brushes and the power for operating them. Fig. 2 is a side view of the driving power and one of the swinging brushes. Fig. 3 is a sectional view of the locking-slide and one of the brush-shafts.

Similar letters of reference indicate corresponding parts in the several figures.

The object of this invention is to furnish hotels, hospitals, places of public amusements, and other places with fly-brushes or fans which are actuated by clock-work, and which are connected together and so constructed that any one or more of them can be hung up out of the way when not required without detaching them from each other, as will be hereinafter explained.

The following description of my invention will enable others skilled in the art to fully understand it.

To the ceiling of the room in which it is desired to employ the fly-brushes or fans I connect the fan-shaft G by means of pivots $g$, which will allow them to be vibrated freely. One of these shafts G I connect to an escapement, $l$, but all the others, however many may be used, are attached to the ceiling and arranged in any suitable manner. Each fan-shaft G is composed of two sections, which are jointed together at $x$, so that the lower section can be raised or supported upon a pendent hook, $k$, as indicated by dotted lines in Fig. 1. When it is desired to use the fan $f$ of any one or more of the shafts G the jointed lower section is lifted from its suspension-hook $k$ and brought into line with the upper section, after which a tubular slide, $g$, (which is acted on by a spring, $s$, to hold it in place when raised,) is drawn down over the joint $x$ against a stop-pin, $f^1$, which stiffens the joint and prevents flexibility of the shaft. The slides $g$ are constructed with eye-pieces $i$, to which rods $j$ are attached, which rods connect the shafts together, so that when the pendulum-shaft G is vibrated all the shafts which are connected together are vibrated. The power for driving the shafts G is derived from a weight, W, acting through the medium of wheel-work; but instead of the weight, spring or other power might be adopted. B represents a frame of suitable construction, which may be suspended from the ceiling A, or from any other object, and which affords bearings for two shafts, $r$ $o$, and with the aid of a hanger, $a$, supports the post of an escapement, $l$. The shaft $r$ carries a toothed pinion, $d$, which engages with a large spur-wheel, D, which is applied loosely on the shaft $o$. A winding-drum, J, is secured fast on the shaft $o$, and engages with the wheel D by means of a spring-pawl and ratchet, (not shown in the drawings.) On one end of the shaft $o$ a crank, $n$, is applied, by means of which the drum J can be rotated, and a cord, $c$, wound upon it, on one end of which cord is suspended, from a pulley, P', the weight W. When the weight W is wound up it will react to turn the shaft $r$, which has an escapement-wheel, C, on one end, the pins $p$ of which have their points of repose on the escapement $l$. By these means the pendulum-shaft receives vibratory motion, which is transmitted to all the other shafts which are connected to it. Each one of the shafts G has a socket, $t$, in its lower end for receiving a tenon which is formed on the head of the fly-brush $f$. A set-screw, $f^2$, confines the brush to the shaft. Instead of brushes, fans may be used.

It will be seen from the above description that any desired number of the brush or fan shafts G can be driven from the pendulum-shaft G, and that any one or more of these shafts can be adjusted upon the hooks $k$, when they will receive vibratory motion, but will be practically out of operation—that is to say, they will neither fan nor brush off flies, but will be moved back and forth in the hooks.

Having described my invention, what I claim as new, and desire to secure by Letters Patent, is—

Vibrating suspended shafts G, carrying fans or fly-brushes, and composed, respectively, of jointed sections and stiffening-slides $g$, in combination with hooked supports $k$, substantially as and for the purposes described.

JOHN DANIEL BUSH.

Witnesses:
DAVID R. DUNLAP,
JOHN P. PARK.